(12) United States Patent
Keeney

(10) Patent No.: US 6,167,997 B1
(45) Date of Patent: Jan. 2, 2001

(54) ELECTRONICALLY CONTROLLED CLUTCH ACTUATION SYSTEM

(75) Inventor: Christopher S. Keeney, Troy, MI (US)

(73) Assignee: ZF Meritor, Laurinburg, NC (US)

( * ) Notice: Under 35 U.S.C. 154(b), the term of this patent shall be extended for 0 days.

(21) Appl. No.: 09/255,884

(22) Filed: Feb. 23, 1999

(51) Int. Cl.[7] .............................. F16D 23/14; F16D 28/00
(52) U.S. Cl. .............................. 192/40; 192/90; 192/94; 192/84.6
(58) Field of Search .............................. 192/40, 84.6, 90, 192/94

(56) References Cited

U.S. PATENT DOCUMENTS

| | | |
|---|---|---|
| 1,635,068 * | 7/1927 | Bing ..................................... 192/84.6 |
| 2,072,832 * | 3/1937 | Weydell .............................. 192/90 X |
| 4,604,558 | 8/1986 | Hirsch . |
| 4,648,498 * | 3/1987 | Herbulot et al. ................. 192/84.6 X |
| 4,865,173 * | 9/1989 | Leigh-Monstevens et al. ... 192/94 X |
| 5,267,635 * | 12/1993 | Peterson et al. ................. 192/84.6 X |
| 5,353,902 | 10/1994 | Flowtow et al. . |
| 5,934,430 | 8/1999 | Kolomeitsev et al. . |
| 5,947,857 | 9/1999 | Organek et al. . |

FOREIGN PATENT DOCUMENTS

| | | |
|---|---|---|
| 2279124 | 12/1994 | (GB) . |
| 98/58189 | 12/1998 | (WO) . |

* cited by examiner

*Primary Examiner*—Richard M. Lorence
(74) *Attorney, Agent, or Firm*—Carlson, Gaskey & Olds

(57) ABSTRACT

Clutches are provided with electrically controlled actuation elements for selectively moving a sleeve between engaged and non-engaged positions. The electrically controlled elements may include rotary motors driving a sleeve through a ball screw connection. An actuator having a distance amplification element for driving the sleeve is also disclosed.

9 Claims, 3 Drawing Sheets

ELECTRONICALLY CONTROLLED CLUTCH ACTUATION SYSTEM

BACKGROUND OF THE INVENTION

This invention relates to a clutch which is actuated by an electronically controlled and powered actuation system.

Clutches are utilized to selectively transmit drive between an input shaft to an output shaft. As an example, most vehicle drive lines have a clutch between the engine and the transmission. By selectively actuating the clutch, the driver can break the rotational drive from the engine to the transmission such as to allow gear shifting.

Typically, known transmissions are mechanically controlled through a foot pedal and lever and spring mechanism. These known systems require relatively large actuation systems which create packaging and layout problems. Further, these systems have not been suitable for automatic control.

It is known to automatically actuate the clutch; however, the actuation systems have not been as well designed as would be desirable. As an example, hydraulic power systems have been used which require pump tubes, etc. Again, it is desirable to make the actuation system as compact as practical.

SUMMARY OF THE INVENTION

In a disclosed embodiment of this invention, a clutch mechanism is operable to move a sliding sleeve along a shaft between engaged and disengaged positions. The sliding sleeve would preferably move an associated clutch disk to selectively move the clutch between engaged and disengaged positions.

In one embodiment, the sleeve is driven by an annular motor which drives a rotary to linear transmission mechanism for driving the sleeve. In a preferred embodiment, a ball screw arrangement is utilized.

In another embodiment, the mechanism for driving the sleeve has a distance amplifying arrangement. In particular, a motor for creating a small amount of linear movement transmits that linear movement to an input side of a lever. The opposed side of the lever is positioned a greater distance from a fulcrum than the input side. The opposed side of the lever transmits movement to the sleeve. Since the lever fulcrum is positioned more adjacent to the input side, there is an amplification of movement at the transmit side. Thus, the original movement may be provided by known small devices which provide only a small amount of linear movement. As an example, piezoelectric or magnetostrictive actuators may be utilized.

In a third embodiment, the actuator is packaged within the clutch housing and rotating with the clutch cover. A rotating electrical connection supplies power and control to the actuator.

These and other features of the present invention can be best understood from the following specification and drawings, the following of which is a brief description.

DETAILED DESCRIPTION OF A PREFERRED EMBODIMENT

Figure 1:
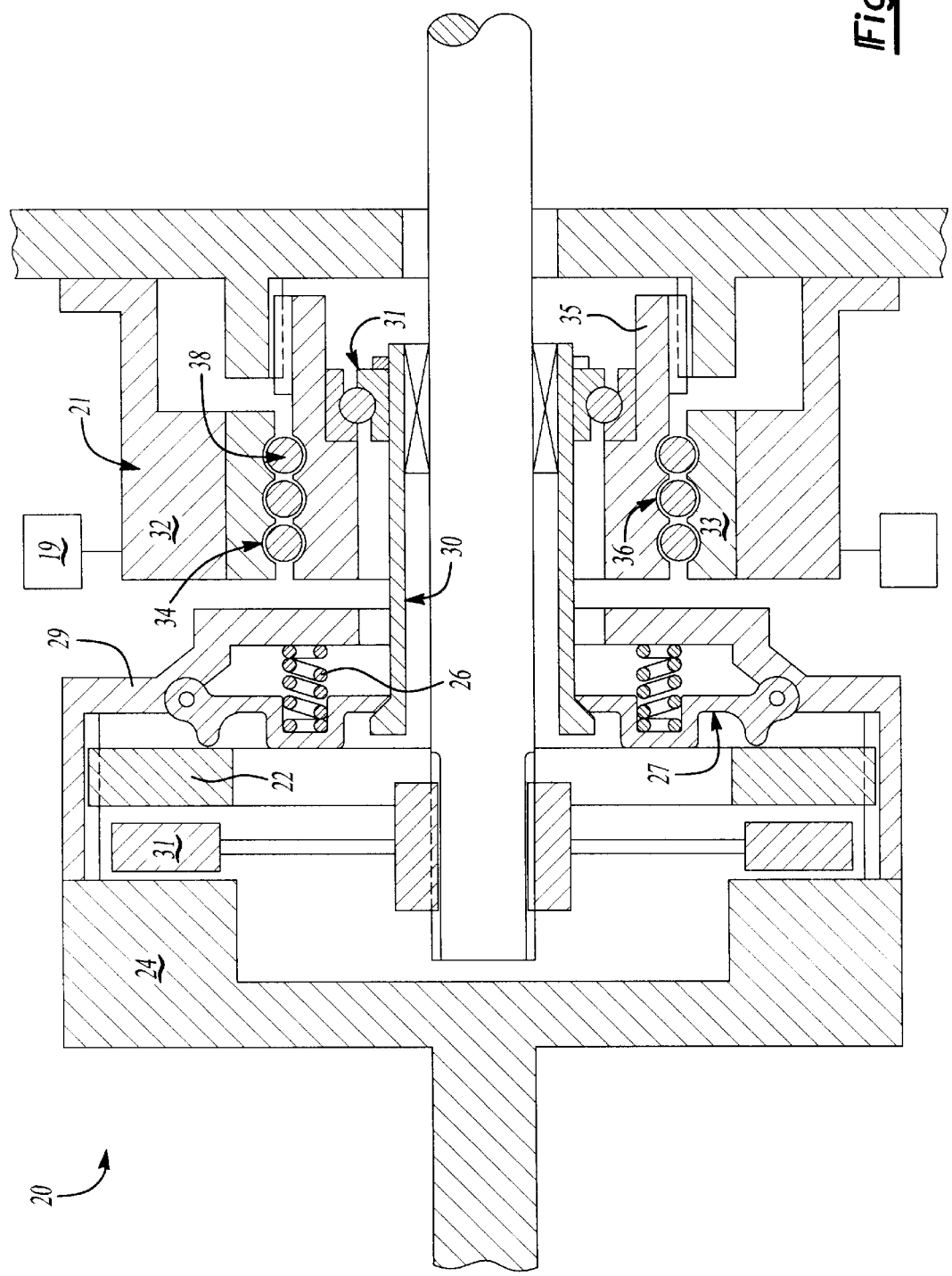
FIG. 1 shows a first embodiment of the present invention.

A clutch mechanism 20 is illustrated in FIG. 1 having a motor element 21 which is actuatable to selectively bring a pressure plate 22 to capture a disk 131 between the pressure plate 22 and a disc 24. The structure of pressure plate 22, disc 24 and disc 31 is as known in the art. A spring 26 biases a lever 27 relative to a plate 29. A sleeve 30 is movable to the right as shown in FIG. 1 to pull the lever 27 in a direction to cause the pressure plate 22 to move to the right. Bearing 31 is a thrust bearing which moves with an inner nut 35. Nut 35 has threads 36 which are associated with mating threads 34 on a coil 33 of the motor 21. Notably, portions 33 and 32 are stationary. The illustrated motor is an annular motor, such as are known. This type is generally "doughnut" shaped and provides packaging benefits in this application. A plurality of balls 38 form a ball screw arrangement between the portions 33 and 35. The motor 32, 33 is prevented from linear movement, and is constrained to rotate. Since sleeve 30 cannot rotate, it is constrained to linear movement. Upon actuation of the coil 33, the nut 35 is caused to move axially. A control 19, shown schematically, is operable to actuate the motor 32 to cause this movement. In turn, the sleeve 30 is caused to move axially and the lever 27 moves to move the pressure plate 22.

The control 19 may be actuated in response to an operator actuation of a foot pedal, or under the control of an automatic clutch actuation system. The use of the rotary motor 32, 33 provides a very compact arrangement that is an improvement over the prior art.

Figure 2:
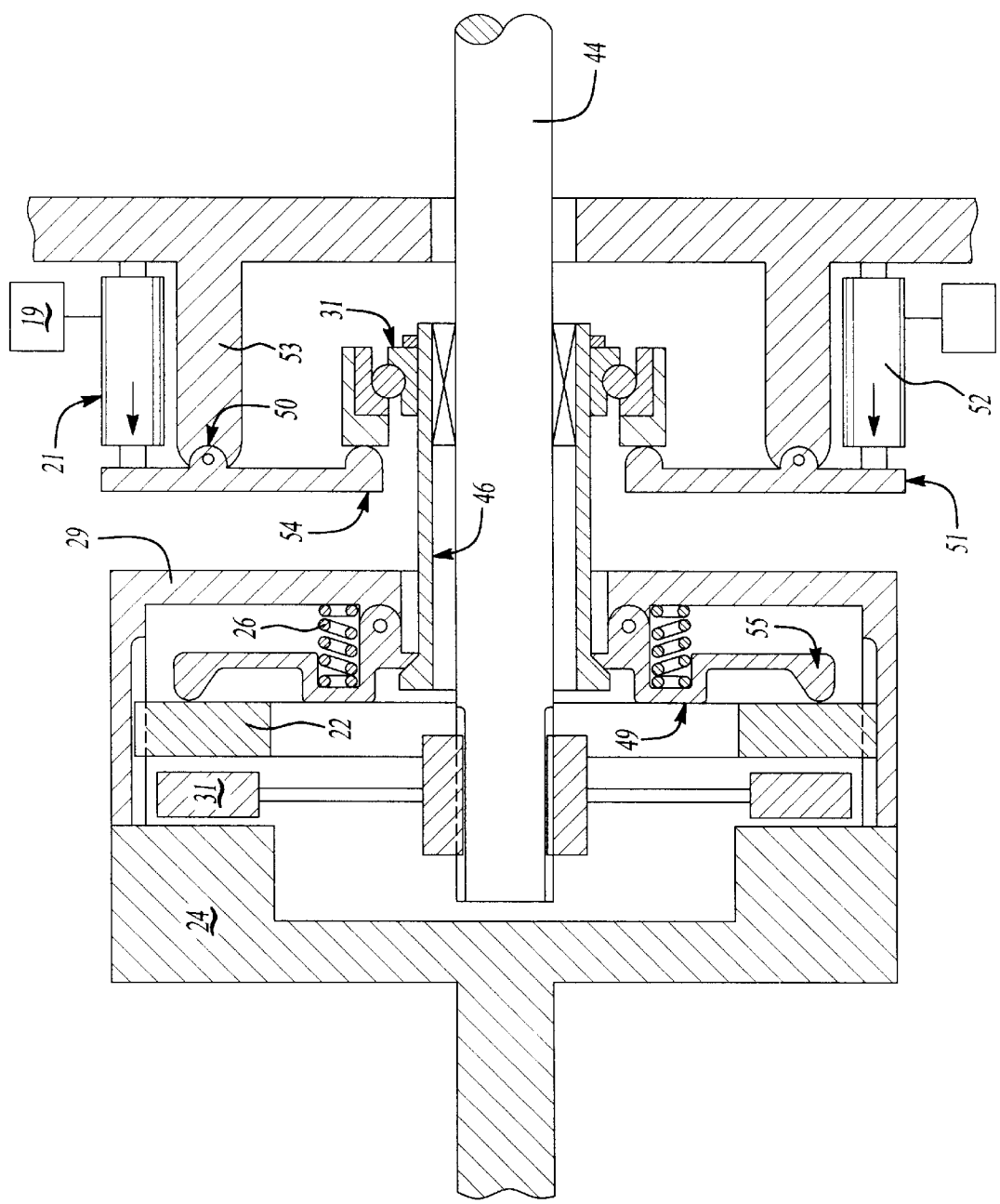
FIG. 2 shows a second embodiment of the present invention.

As shown in FIG. 2, a lever 49 is again biased by a spring 26 relative to a plate 29. Sleeve 46 moves the lever 49 and is itself moved through a thrust bearing connection 31. A second lever 54 is mounted at 50 to a plate 53. A motor 52 drives an end portion 51 of the lever 54. The motor 52 is of any known type which expends or otherwise moves to actuate the lever and move the input end 51. As an example, a piezoelectric or a magnetostrictive actuator may be utilized.

As shown, the pivot point 50 for the lever 54 is closer to motor 52 than to the thrust bearing 31. Thus, movement of the lever will be "amplified". Thus, a relatively small amount of movement at the actuator 52 will be translated into a greater amount of movement of the thrust bearing 31 and sleeve 46. Similarly, the pivot point for the lever 49 is closer to the input connection to the sleeve 46 than the output connection 55 to the pressure plate 22. Again, this will cause amplification of the movement.

Figure 3:
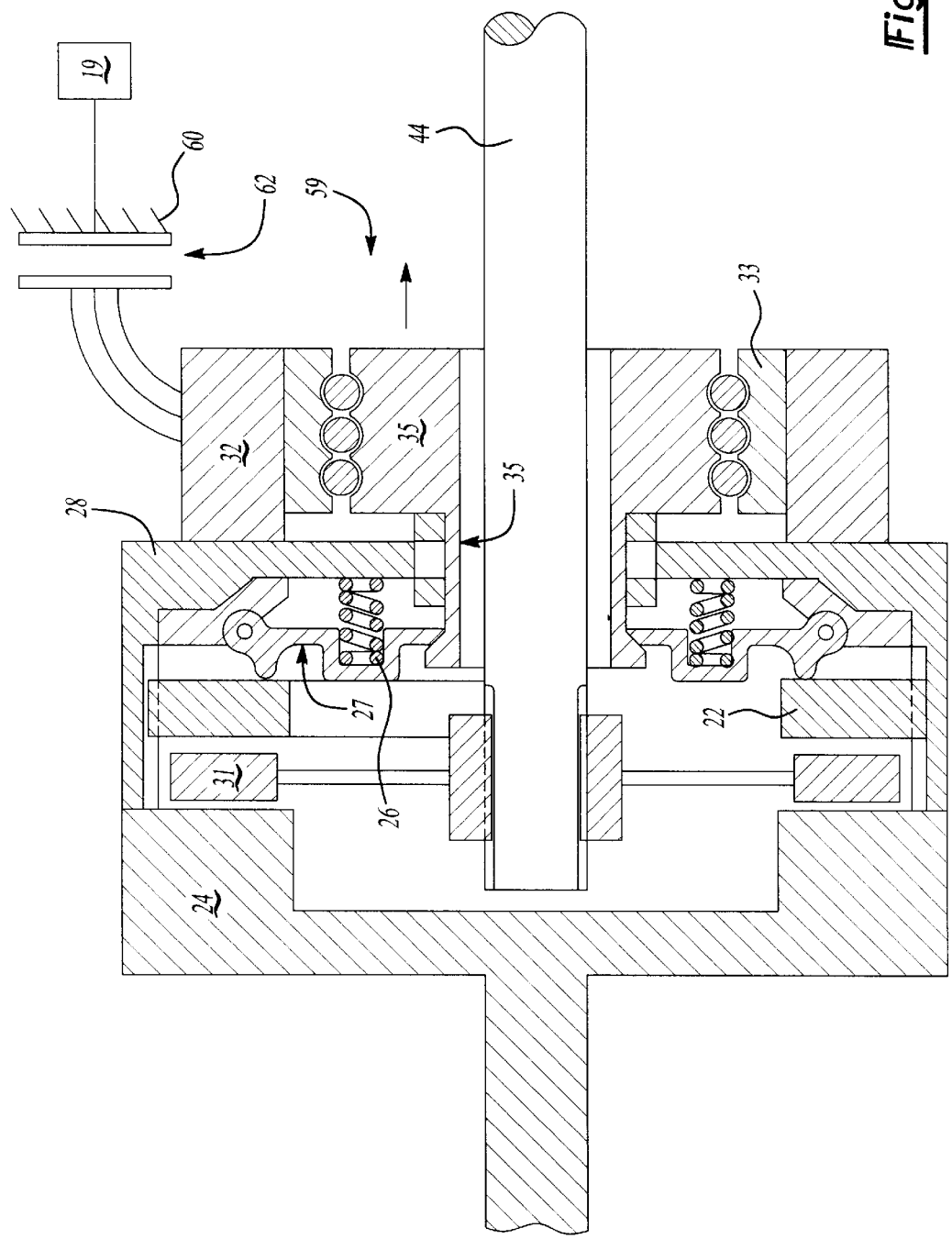
FIG. 3 shows a third embodiment of the present invention.

FIG. 3 shows another embodiment 59 where a driven ball screw member 35 is fixed to the sleeve 30. The embodiment shown in FIG. 3 has the actuator portion 32 fixed to the clutch cover 60. Part 28 is fixed to cover 60, and rotates with pressure 22. The arrangement other than these aspects is relatively similar to the FIG. 1 embodiment. As known, a clutch cover 60 and thus the actuator 32 rotate during operation of the clutch. A rotating electrical power and control input connection 62 is utilized to supply electrical energy and controls to and from the actuator 32.

This can be done with known methods such as mechanical slip rings or telemetry. Further fluid slip rings, etc. can also be utilized. The FIG. 3 embodiment has several advantages. The clutch and its actuation system can be prepackaged as an integral unit. This will provide ease of maintenance and assembly and modular design. Further, no actuator mounting points have to be designed on the engine or transmission housing. Thus, design considerations relative to the engine and transmission manufacturer are simplified. Further, the structural requirements of the clutch housing are reduced, because the disengagement forces generated within this assembly will result mainly in compression stresses in the clutch housing, rather than bending stresses. This may sometimes be desirable.

All clutch types, and in particular both pull-type and come within the scope of this invention. Further, while single disc clutches are shown, the invention does extend to multiple disc clutches. Also, the invention extends to diaphragm spring clutches, as well as the illustrated coil-spring type.

Most preferably, the inventive clutch is a dry friction clutch such as utilized in automotive applications.

Preferred embodiments of this invention have been disclosed; however, a worker of ordinary skill in the art would recognize that certain modifications come within the scope of this invention. For that reason, the following claims should be studied to determine the true scope and content of this invention.

What is claimed is:

1. A clutch comprising:
    a first shaft and a second shaft to be connected for selective drive;
    a first member fixed for rotation with said first shaft, and a sliding sleeve for sliding movement along said second shaft, and for carrying a second member for selective engagement with said first member, and
    an electrical actuator member for sliding said sleeve between actuated and non-actuated positions, and a control for actuating said electrical actuator member, said clutch including a clutch cover, and said electric actuator being fixed to rotate with said clutch cover.

2. A clutch as recited in claim 1, wherein said electrical actuator member is a rotary electric motor.

3. A clutch as recited in claim 2, wherein said rotary electric moat drives a ball screw connection to turn a threaded element and cause axial movement of said sleeve.

4. A clutch as recited in claim 1, wherein a rotating electric connection supplies electricity to said electric actuator on said clutch from said prior to control.

5. A clutch as recited in claim 1, wherein said electric actuator surrounding said sleeve.

6. A clutch as recited in claim 1, wherein said sleeve moving a lever to allow said sleeve to move said second and first members into said selective engagement.

7. A clutch comprising:
    a first shaft and a second shaft to be connected for selective drives;
    a first member fixed for rotation with said first shaft, and a sliding sleeve for sliding movement along said second shaft, and for carrying a second member for selective engagement to said first member to move said clutch between actuated and non-actuated positions; and
    a rotary electric motor surrounding said sliding sleeve, said rotary electric motor including a stator driving a rotor, said rotor having threads at an inner peripheral surface in a bore, and said sleeve being provided with threads at an outer peripheral surface, a plurality of rotation transmission elements being positioned between said rotor and said sleeve such that rotation of said rotor causes linear movement of said sleeve, said clutch including a clutch cover, and wherein said motor being fixed to rotate with said clutch cover.

8. A clutch as recited in claim 7, wherein there are a plurality of ball elements between said threads on said sleeve and said rotor.

9. A clutch as recited in claim 7, wherein said sleeve moving a lever to allow said sleeve to move said second and first members into said selective engagement.

* * * * *